US007516441B2

(12) United States Patent
Hamilton et al.

(10) Patent No.: US 7,516,441 B2
(45) Date of Patent: Apr. 7, 2009

(54) METHOD AND SYSTEM FOR PROGRAM EDITING AND DEBUGGING IN A COMMON LANGUAGE RUNTIME ENVIRONMENT

(75) Inventors: Jennifer A Hamilton, Bellevue, WA (US); Michael M Magruder, Issaquah, WA (US); James H Hogg, Bellevue, WA (US); William G Evans, Woodinville, WA (US); Vance P Morrison, Kirkland, WA (US); Lawrence B Sullivan, Renton, WA (US); Sean E Trowbridge, Sammamish, WA (US); Jason L Zander, Sammamish, WA (US); Ian H Carmichael, Sammamish, WA (US); Patrick H Dussud, Bellevue, WA (US); John L Hamby, Issaquah, WA (US); John J Rivard, Redmond, WA (US); Li Zhang, Sammamish, WA (US); Mario Chenier, Woodinville, WA (US); Douglas Rosen, Woodinville, WA (US); Steven J Steiner, Seattle, WA (US); Peter A Hallam, Seattle, WA (US); Brian R Crawford, Seattle, WA (US); James S Miller, Bellevue, WA (US); Sam Spencer, Redmond, WA (US); Habib Heydarian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/896,610

(22) Filed: Jul. 21, 2004

(65) Prior Publication Data

US 2005/0034109 A1 Feb. 10, 2005

Related U.S. Application Data

(63) Continuation-in-part of application No. 09/873,596, filed on Jun. 4, 2001, now Pat. No. 6,836,884.

(51) Int. Cl.
 *G06F 9/44* (2006.01)
(52) U.S. Cl. .................. 717/110; 717/153; 714/38; 707/103 R
(58) Field of Classification Search ......... 717/107–116, 717/127–129, 124, 140
See application file for complete search history.

(56) References Cited

U.S. PATENT DOCUMENTS 5,313,387 A * 5/1994 McKeeman et al. ........... 700/90

(Continued)

OTHER PUBLICATIONS

U. Holzle, C. Chambers, and D. Ungar. Debugging Optimized Code with Dynamic Deoptimization. Proceedings of the ACM SIGPLAN 1992 Conference, pp. 32-43, 1992.

(Continued)

*Primary Examiner*—Wei Y Zhen
*Assistant Examiner*—Phillip H Nguyen
(74) *Attorney, Agent, or Firm*—Amin, Turocy & Calvin, LLP

(57) ABSTRACT

A system and method of providing edit and continue support in a software program debugging environment. "Edit and continue" support allows a user (e.g., programmer and/or developer) to update the code and/or data structure(s) of an executing program while it is running. After the user has finished editing their code and resumes execution, an integrated development environment (IDE) propagates the edit(s) into a common language runtime (CLR) environment before continuing. Therefore, from the CLR environment's perspective, an edit is a block of intermediate language code (IL) and/or metadata that is inserted into a running process. Moreover, The IDE can facilitate: determining "legality" of an edit; building the edit; sending the edit to the CLR environment; and/or, facilitating the CLR environment switch execution to the edited code.

16 Claims, 7 Drawing Sheets

U.S. PATENT DOCUMENTS

| | | | |
|---|---|---|---|
| 5,495,613 A * | 2/1996 | Brody | 717/110 |
| 5,586,328 A | 12/1996 | Caron et al. | |
| 5,732,210 A * | 3/1998 | Buzbee | 714/38 |
| 5,732,263 A * | 3/1998 | Havens et al. | 707/103 R |
| 5,805,889 A * | 9/1998 | Van De Vanter | 717/107 |
| 5,836,014 A * | 11/1998 | Faiman, Jr. | 717/156 |
| 5,848,274 A * | 12/1998 | Hamby et al. | 717/153 |
| 5,854,932 A | 12/1998 | Mariani et al. | |
| 5,956,512 A * | 9/1999 | Simmons et al. | 717/128 |
| 6,094,528 A | 7/2000 | Jordan | |
| 6,185,597 B1 | 2/2001 | Paterson | |
| 6,240,545 B1 * | 5/2001 | Carmichael et al. | 717/128 |
| 6,246,403 B1 * | 6/2001 | Tomm | 715/762 |
| 6,253,368 B1 | 6/2001 | Nelin et al. | |
| 6,282,701 B1 * | 8/2001 | Wygodny et al. | 717/125 |
| 6,353,923 B1 * | 3/2002 | Bogle et al. | 717/128 |
| 6,484,312 B1 * | 11/2002 | Morrison | 717/146 |
| 6,647,544 B1 | 11/2003 | Ryman et al. | |
| 6,751,583 B1 * | 6/2004 | Clarke et al. | 703/17 |
| 6,957,422 B2 * | 10/2005 | Hunt | 717/130 |
| 6,961,924 B2 * | 11/2005 | Bates et al. | 717/125 |
| 6,964,036 B2 * | 11/2005 | Bates et al. | 717/125 |
| 7,107,578 B1 * | 9/2006 | Alpern | 717/124 |
| 7,149,966 B2 * | 12/2006 | Jones et al. | 715/513 |
| 7,150,006 B2 * | 12/2006 | Bliss et al. | 717/124 |
| 7,155,298 B2 * | 12/2006 | Rutkowski | 700/87 |
| 7,168,062 B1 * | 1/2007 | Schmitter | 717/110 |
| 7,240,340 B2 * | 7/2007 | Vaidyanathan et al. | 717/143 |
| 7,243,334 B1 * | 7/2007 | Berger et al. | 717/109 |
| 7,269,828 B2 * | 9/2007 | Civlin | 717/158 |
| 7,284,233 B2 * | 10/2007 | Sengodan | 717/102 |
| 2002/0073398 A1 * | 6/2002 | Tinker | 717/110 |
| 2004/0054994 A1 | 3/2004 | Demsey et al. | |

OTHER PUBLICATIONS

J.J. Hart. The Advanced Interactive Debugging System(AIDS). ACM SIGPLAN Notices, vol. 14 Issue 12, pp. 110-121, 1979.

M.M. Tikir, et al. Recompilation for Debugging Support in a JIT-Compiler. Proceedings of the 2002 ACM SIGPLAN-SIGSOFT Workshop, pp. 10-17, 2002.

E. Adams, et al. SunPro: Engineering a Practical Program Development Environment. Advanced Programming Environments, Proceedings of an International Workshop, pp. 86-96, 1986.

D. Truong, et al. Measuring C++ Program Efficiency. Dr. Dobb's Journal, vol. 25 No. 10, pp. 62-67, 2000.

J. Fiddler, et al. VxWorks-Unix Real-Time Network and Development System. Wescon/86 Conference Record, p. 9/3/1-3, 1986.

* cited by examiner

METHOD AND SYSTEM FOR PROGRAM EDITING AND DEBUGGING IN A COMMON LANGUAGE RUNTIME ENVIRONMENT

CROSS-REFERENCE TO RELATED APPLICATIONS

This application is a continuation-in-part of co-pending U.S. utility application Ser. No. 09/873,596 filed on Jun. 4, 2001, entitled METHOD AND SYSTEM FOR PROGRAM EDITING, the entirety of which is incorporated herein by reference.

TECHNICAL FIELD

The present invention relates generally to computer systems, and more particularly to improved methods and systems for editing software programs in a computer system.

BACKGROUND OF THE INVENTION

Editing and debugging systems are commonly employed to facilitate development of software programs. Such systems typically include or interact with compilers, which take source code written by a user and generate native code therefrom, which may be executed by a processor in a computer system or embedded system. The native code is generally specific to a given processor type or family, whereas the source code and the compiler are language specific. Thus, different compilers and debuggers are adapted for generating programs for execution on different processors from source code written in a given programming language.

Advances in software development technologies have resulted in the ability to develop software programs from software components written in different programming languages. Such advances facilitate the reuse of existing programs or software components, whereby programmers may employ the services or features of existing programs in generating new programs with higher functional performance. Recently, common language runtime systems have been developed in which such software components from diverse source languages may be easily joined together to form new software programs. However, current editing and debugging tools for common language runtime systems provide only limited functionality.

Other software development technologies provide runtime support for developed software by employing interpreters. An interpreter does not perform compilation of source code as a whole into machine-executable. Rather, the interpreter translates one program statement (e.g., in a source language program file) into machine language, executes it, then proceeds to the next statement. This differs from regular (e.g., compiled) executable programs that are presented to the computer as binary-coded instructions. Debugging interpreted programs may be facilitated by the line-by-line operation of the interpreter, since a single line of code can be tested interactively. However, interpreted programs generally run slower than do compiled programs. This is because a compiler translates the entire program before it is run, whereas an interpreter translates a line at a time when the program is run.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods associated with edit and continue support in a software program debugging environment. "Edit and continue" support allows a user (e.g., programmer and/or developer) to update the code and/or data structure(s) of an executing program while it is running. The present invention thus facilitates improved software editing and debugging tools that provide advanced editing capabilities and which provide support for common language runtime environments.

In accordance with an aspect of the present invention, a common language runtime (CLR) environment is provided. For example, the CLR environment can be employed in conjunction with an integrated development environment (IDE) to facilitate "edit and continue" modification of a software program.

From an end-user's perspective, an edit is a change to the source code of a program being debugged, while that program is stopped. After the user has finished editing their code and resumes execution, the IDE (e.g., debugger) propagates their edits into the running process before truly continuing. Therefore, from the CLR environment (e.g., runtime)'s perspective, an edit is a block (e.g., blob) of intermediate language code (IL) and/or metadata that must be inserted into a running process.

Thus, the CLR environment can facilitate editing of a software program in an environment that provides for a wide range of editing capabilities not conventionally available. The invention provides for partial execution of a native code component in the CLR environment via an edit and continue component, wherein execution may be suspended at a point in the program. A user (e.g., developer) can make change(s) to source code associated with the native code component, and thereafter continue execution (e.g., one instruction at a time, or several instructions at a time).

Another aspect of the present invention provides for an integrated development environment (IDE). The IDE can facilitate development and/or debugging of software program(s), and, more particularly, "edit and continue" modification of software program(s). For example, the IDE can facilitate:

Determining "legality" of an edit;
Building the edit;
Sending the edit to the CLR environment; and/or,
Facilitating the CLR environment switch execution to the edited code.

The IDE allows a user (e.g., developer) to run, edit, and/or debug a software program in a computer system. The software program can include source code component created in one or more source code languages (e.g., Visual Basic, C++, C#, JavaScript, APL, COBOL, Pascal, Eiffel, Haskell, ML, Oberon, Perl, Python, Scheme, Smalltalk, Objective Caml, and the like). An intermediate language component is created from the source code component using a language specific source compiler and the native code component (e.g., machine executable instructions) is created from the intermediate language component using the intermediate language compiler (e.g., just-in-time (JIT) compiler).

In accordance with an aspect of the present invention, when a function is edited, the IDE (e.g., debugger) presents the edit to the CLR environment (e.g., debugger engine). In this example, the CLR environment is not generally expected to validate that the edit was correct and, if not, rollback the edit if an error is discovered. Instead, the IDE (e.g., debugger) is responsible for ensuring that edit(s) given to the CLR environment are free from "rude edits" (e.g., edit(s) identified by the CLR environment to be invalid).

Another aspect of the present invention provides for the IDE to build the edit thus passing a block of (e.g., blob) of metadata and, if the edit modifies any IL, a block (e.g., blob) of IL to the CLR environment.

Additionally, once delta IL and metadata blocks (e.g., blobs) have been created in the IDE it can send the changes into the CLR environment. The CLR environment updates its metadata, places the new IL into the process, and sets up a compile (JIT) of the new IL via the IL compiler.

Because an edit replaces the entire body of a function, the flow of control must be transferred to the new body before the effects of the edit can be seen. Transferring the flow of control involves first remapping the function's stack frame to incorporate any new locals, then moving the instruction pointer for that frame from the old code to the new code. These two steps are generally referred to together as remapping.

In accordance with an aspect of the present invention, the IDE is responsible for determining an IL offset in a new version and for remapping any stepper(s) and/or breakpoint(s). The CLR environment (e.g., debugger engine) only notifies the IDE (e.g., debugger) that a remap is about to take place from a first version of a method to a second version m and provides the IL offset in the first version. The IDE (e.g., debugger) is responsible for determining the IL offset in the second version and for remapping any steppers or breakpoints.

With edit and continue functionality as provided by the present invention, a new field can be added to a class, even if there are already existing instantiations of that class. In accordance with yet another aspect of the present invention, a mechanism facilitating lifetime of a dependent object in order to mitigate cycles in an object graph is provided.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
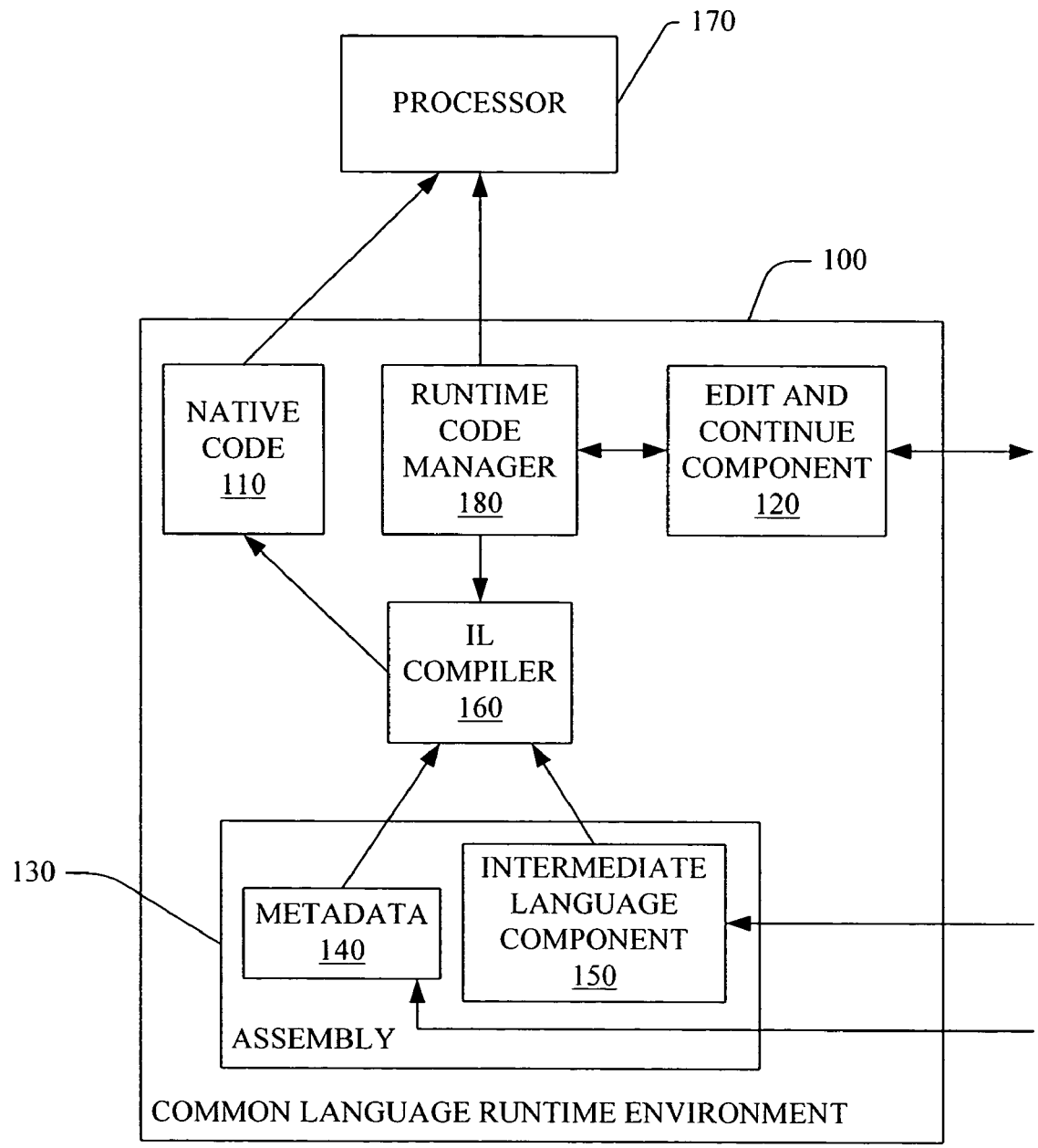
FIG. 1 is a block diagram of a common language runtime (CLR) environment in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

The present invention relates to systems and methods associated with edit and continue support in a software program debugging environment. "Edit and continue" support allows a user (e.g., programmer and/or developer) to update the code and/or data structure(s) of an executing program while it is running. The present invention thus facilitates improved software editing and debugging tools that provide advanced editing capabilities and which provide support for common language runtime environments.

Referring to FIG. 1, a common language runtime (CLR) environment 100 in accordance with an aspect of the present invention is illustrated. For example, the CLR environment 100 can be employed in conjunction with an integrated development environment (not shown) to facilitate "edit and continue" modification of a software program.

From an end-user's perspective, an edit is a change to the source code of a program being debugged, while that program is stopped. After the user has finished editing their code and resumes execution, the IDE (e.g., debugger) must propagate their edits into the running process before truly continuing. Therefore, from the CLR environment (e.g., runtime)'s perspective, an edit is a blob of intermediate language code (IL) and/or metadata that must be inserted into a running process.

Thus, the CLR environment 100 can facilitate editing of a software program in an environment that provides for a wide range of editing capabilities not conventionally available. The invention provides for partial execution of a native code component 110 in the CLR environment 100 via an edit and continue component 120, wherein execution may be suspended at a point in the program. A user (e.g., developer) can make change(s) to source code associated with the native code component 110, and thereafter continue execution (e.g., one instruction at a time, or several instructions at a time).

Conventional editing and debugging tools for compiled programs typically do not offer line-by-line execution capabilities together with the ability to stop execution, edit a source program, and continue from the point where execution left off. In addition, debugging tools that provide edit and continue features are limited in the amount and nature of the edits that a user may perform. Moreover, such tools are not adaptable to debugging code in a common language runtime environment.

The CLR environment 100 includes an assembly 130 having metadata 140 and an intermediate language (IL) component 150. The assembly 130 is employed by an intermediate language (IL) compiler 160 to generate the native code component 110 to be run on a processor 170. The CLR environment 100 further includes a runtime code manager 180 that can facilitate loading and operating of the assembly 130 by the processor 170.

Figure 2:
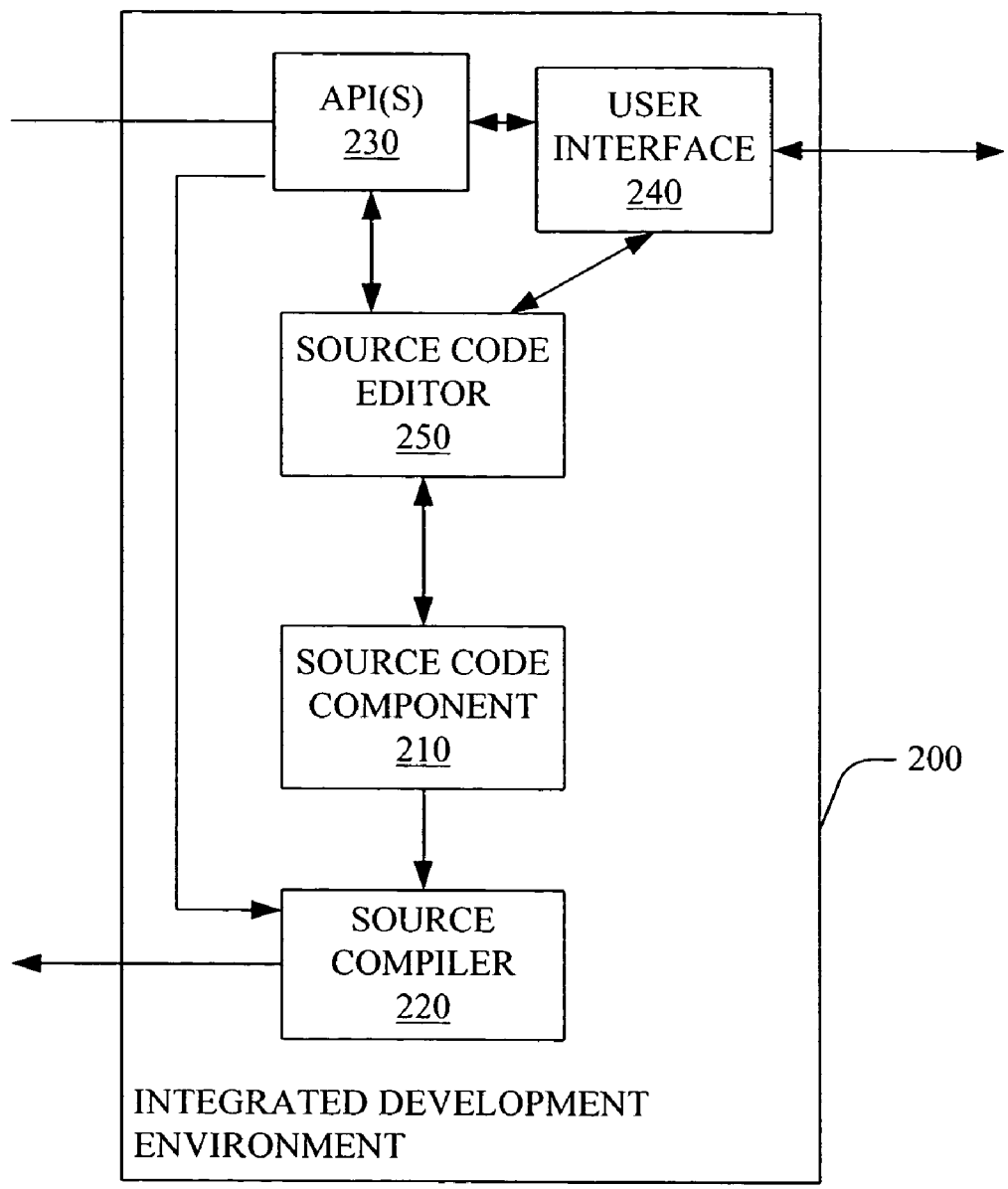
FIG. 2 is a block diagram of an integrated development environment (IDE) in accordance with an aspect of the present invention.

Next, referring to FIG. 2, an integrated development environment (IDE) 200 in accordance with an aspect of the present invention is illustrated. The IDE 200 can facilitate development and/or debugging of software program(s), and, more particularly, "edit and continue" modification of software program(s). For example, the IDE 200 can facilitate:

Determining "legality" of an edit;
Building the edit;
Sending the edit to the CLR environment 100; and/or,
Facilitating the CLR environment 100 switch execution to the edited code.

Figure 3:
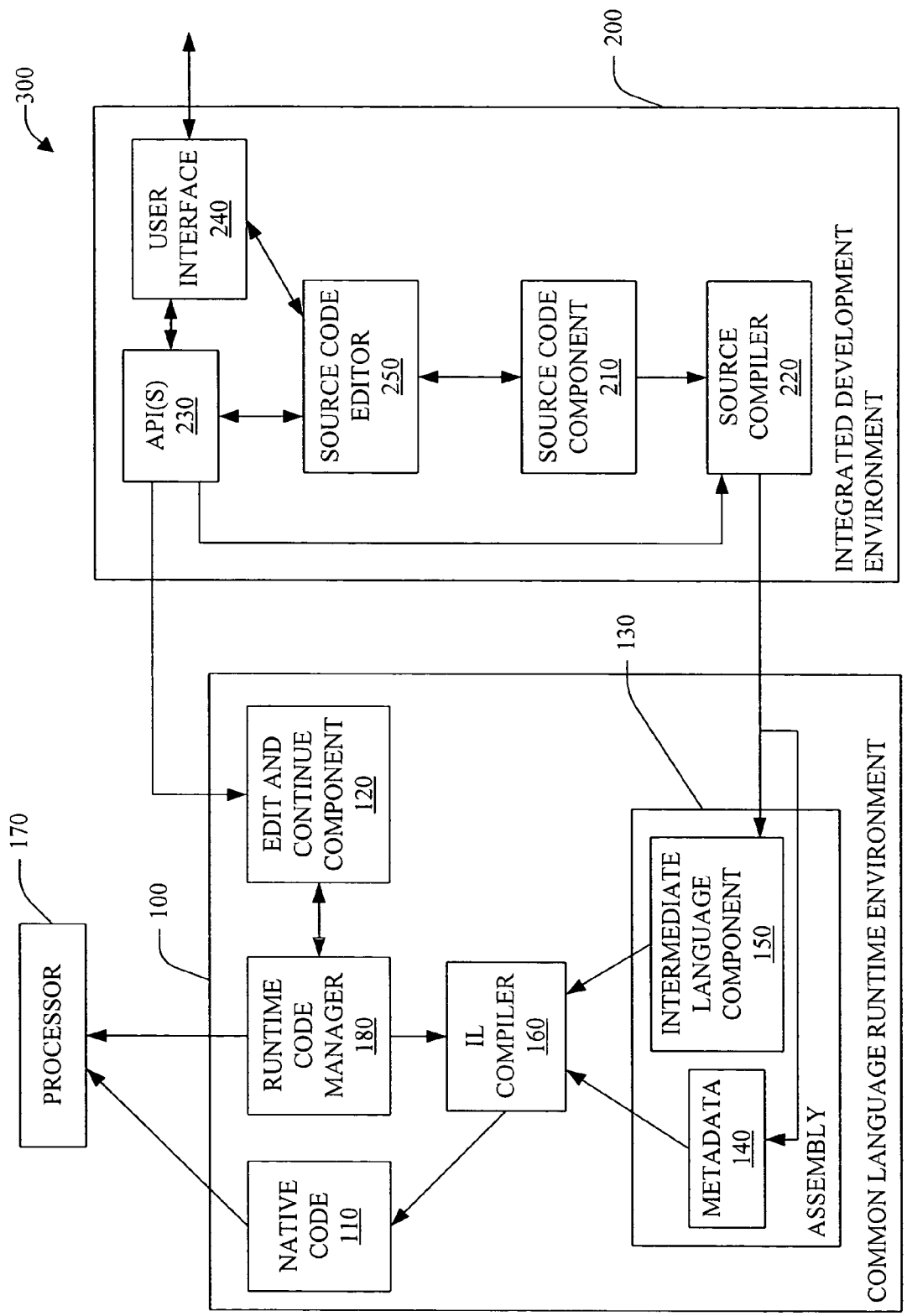
FIG. 3 is a block diagram of a system that facilitates programming editing in accordance with an aspect of the present invention.

As illustrated in FIG. 3, in accordance with an aspect of the present invention, the CLR environment 100 can be employed in conjunction with the IDE 200 as components of a system 300 that facilitates programming editing.

Referring to FIGS. 2 and 3, the IDE 200 allows a user (e.g., developer) to run, edit, and/or debug a software program in a computer system. The software program can include source code component 210 created in one or more source code languages (e.g., Visual Basic, C++, C#, JavaScript, APL, COBOL, Pascal, Eiffel, Haskell, ML, Oberon, Perl, Python, Scheme, Smalltalk, Objective Caml, and the like). An intermediate language component 150 is created from the source code component 210 using a language specific source compiler 220 and the native code component 110 (e.g., machine executable instructions) is created from the intermediate language component 150 using the intermediate language compiler 160 (e.g., just-in-time (JIT) compiler).

A user (not shown) can create and/or edit the source code component 210 according to known software programming techniques and the specific logical and syntactical rules associated with a particular source language, via a user interface 240 and a source code editor 250 in the IDE 200. Thereafter, the source code component 210 can be compiled via a source compiler 220, whereby an intermediate language representation of the program is created, such as an assembly 130. As noted previously, the assembly 130 comprises the IL component 130 and metadata 140. It will be appreciated that the source compiler 220 can be included within, or separate from, the IDE 200.

As discussed below, the IL compiler 160 is operable to compile intermediate language code (e.g., IL component 150) into native code (e.g., native code component 110).

Error Handling

In accordance with an aspect of the present invention, when a function is edited, the IDE 200 (e.g., debugger) presents the edit to the CLR environment 100 (e.g., debugger engine). In this example, the CLR environment is not generally expected to validate that the edit was correct and, if not, rollback the edit if an error is discovered. Instead, the IDE 200 (e.g., debugger) is responsible for ensuring that edit(s) given to the CLR environment 100 are free from "rude edits" (e.g., edit(s) identified by the CLR environment 100 to be invalid).

Thus, in this example, the CLR environment 100 does very little, if any, error handling since reliance is placed on the IDE 200, and more particularly, the source compiler 220 for ensuring a proper result.

Determining Legality of an Edit

In accordance with an aspect of the present invention, an edit is CLR-legal if the CLR environment 100 can physically apply the changes desired and continue execution. CLR-legality provides that the runtime will successfully apply an edit. The correctness—from an end-user's point of view—of a CLR-legal edit depends on whether the edit correctly reflects the user's intentions and how soon execution can switch to the edited code. Thus, in one example, a particular language can restrict the set of legal edits beyond those set forth herein.

Exemplary CLR-Legal Type Edits

In one example, the following type edits are CLR-legal:

Add a non-virtual private method (static or instance) to a class
Add a private field (static or instance) to a class
Add a private property (static or instance) to a class Note that for the above allowed edits, the type of the field, method, property does not matter—it can be a runtime type, including primitives, value classes, reference types, and/or instantiated generic types. Edits are allowed to introduce previously-unseen instantiations of generics, however they will not be instantiated until the first use of the type in code. For example, for generic value types, this can occur at remap time; for generic reference types, this can occur the first time an object of the type is allocated or method of the type is called.

In this example, there are several exceptions to these general rules:

type edits to value classes or classes with sequential or explicit layout are not allowed
serialization does not pick up new fields
addition of context-local or thread-local variables is not allowed
type edits to parameterized classes are not allowed
adding parameterized methods (even to non-parameterized classes) is not allowed Further, in this example, in general, anything not explicitly listed above is not CLR-legal. For example, no fields or methods can be removed or have their signatures changed.

Note that type edits will seldom be done in isolation. Usually an addition to a type's signature is accompanied by IL that makes use of the addition. Thus, a change can be accompanied by IL that was affected.

CLR-Legal Function Edits

For example, the CLR legality of a function-body edit can generally depend on the state of the function in the process at the time of the edit.

Inactive Functions

If the function is inactive, its body can be replaced with only the following restrictions: no function-body edits are allowed on parameterized functions.

Active Functions

In one example, active functions can be grouped into two categories: leaf and non-leaf. "Leaf function" refers to an active function whose corresponding stack frames are all leaf frames (e.g., the most recently pushed frame on the thread's call stack, corresponding to the most recently called function on that thread). "Non-leaf function" refers to an active function that corresponds to at least one non-leaf frame. In this example, an edit to the body of an active function—whether or non-leaf—has the following restrictions:

it cannot increase the exception-handler nesting to more than a threshold amount (e.g., six), or increase the nesting level of a function that already has more than a threshold amount of levels;

it cannot add a filter, finally, fault, or catch block that contains the instruction pointer (IP). Note that it can, however, in active leaf functions only, add a try block that contains the IP, and add catch blocks to such a try block;

it can only append to the local variable signature for the method;

no editing is allowed in a function that uses localloc.

In a multithreaded environment, a function may be active on more than one thread. Thus, there may be more than one IP to consider when checking the legality of an edit.

In this example, though the CLR environment 100 only allows appending to the local variable signature of a method, a compiler can simulate removing a local. The compiler can remember that a dead local is taking up some space on the stack, but discard the name of that local. Any attempt to access it would cause a compile-time error, and users could even add a new local of the same name as if the first one never existed.

Active Non-Leaf Functions

In this example, an edit to the body of an active non-leaf function has the following restrictions in addition to the ones described above:

it cannot add or remove a try block that contains the IP it cannot add, remove, or change the contents of exception handlers whose try block contains the IP It is to be appreciated that, in many languages, simply adding a symbol in a local scope that shadows a symbol from a broader scope can cause the meaning, and therefore the IL, of a handler to change. The IDE 200 should detect and prevent such edits.

Additionally, in a multithreaded environment, a function may be active on more than one thread. Thus there may be more than one IP to consider when checking the legality of an edit.

Generics

The above sections describe restrictions on edits to parameterized types or methods (e.g., they are not allowed). In this example, there are no other restrictions on the use of generics in edits. To be specific:

Type edits can add fields of instantiated types to non-parameterized classes

Type edits can add methods that return or take parameters of instantiated types

Function-body edits can add locals of instantiated types to non-parameterized functions Function-body edits can call members of and otherwise use instantiated types already existing in the process Building the Edit To make an edit, the IDE 200 (e.g., debugger) passes a block (e.g., blob) of metadata and, if the edit modifies any IL, a block (e.g., blob) of IL to the CLR environment 100. In one example, those blocks are built as follows:

Building the IL Block

In this example, the IL block has a very simple structure. It comprises four bytes of 0s (e.g., reserved for future use) followed by the new IL for the edited functions. These can be structured and aligned according to the same conventions used for PE files, namely that FAT headers are aligned on 4-byte boundaries.

In this example, the new IL for a function completely replaces the old function body.

Building the Delta Metadata Block Set Up For Edit and Continue (Once)

For example, at some time before the first edit, the IDE 200 (e.g., debugger) gets an IMetaDataDispenserEx interface by CoCreating a CorMetaDataDispenser. The IDE 200 debugger then calls SetOption to put the dispenser in Edit and Continue mode (e.g., setting the MetaDataSetENC option to MDUpdateENC).

Copy the Original Metadata

In this example, the IDE 200 makes a copy of the original metadata for a module before editing that module. For example, the IDE 200 can employ ICorDebugModule::GetMetaDataInterface to obtain an IMetaDataEmit interface for the module, then calls SaveToMemory to save a copy to memory.

Get an Editable Emitter

Using its edit and continue-capable dispenser, the IDE 200 obtains an editable emitter by calling OpenScopeOnMemory on its copy of the metadata (as noted previously).

Emit the Changes

The IDE 200 uses the editable emitter to change its copy of the metadata. It ensures that it only emits metadata that corresponds to legal edits (as discussed previously).

In one example, several of the emitter methods require relative virtual address(es) (RVA(s)) (e.g., essentially an offset into a code image). RVA(s) are relative to the start of the IL block, and can only be used to replace function bodies.

Save the Changes to the Delta Metadata Block

In this example, the debugger QueryInterface's the emitter for IMetaDataEmit2, then calls SaveDeltaToMemory to create the metadata block (e.g., blob).

Keeping Multiple Metadata Copies in Sync

The above procedure, in which the IDE 200 uses the same copy of the metadata to emit its changes, ensures that the IDE 200 copy of the metadata matches the module's actual metadata. If for some reason the IDE 200 has a copy of the metadata that it does not use to emit changes, it takes an extra step to keep that copy in sync with the actual metadata.

In this example, whenever the IDE 200 (e.g., debugger) calls ApplyChanges on a module with a delta metadata block (e.g.,) blob, it should also call IMetaDataEmit::ApplyEditAndContinue with the same delta metadata blob on all of its copies of that module's metadata except the one used to emit the changes.

If a copy of the metadata somehow becomes hopelessly out-of-sync with the actual metadata, the IDE 200 (e.g.,) debugger can throw it away and obtain a new copy.

Sending the Edit

In this example, once the delta IL and metadata blocks (e.g., blobs) have been created in the IDE 200's memory, it calls ApplyChanges to send the changes into the CLR environment 100. The CLR environment 200 updates its metadata 140, places the new IL 150 into the process, and sets up a JIT-compile of the new IL via the IL compiler 160. Once the changes have been applied, the IDE 200 (e.g., debugger) can call IMetaDataEmit2::ResetENCLog to prepare for the next editing session. The IDE 200 (e.g., debugger) can then continue the process.

Additionally, in this example, GetFunctionFromToken will return the latest version of the function. Breakpoints can be set in any version of the function.

Switching to the New Code

Because an edit replaces the entire body of a function, the flow of control must be transferred to the new body before the effects of the edit can be seen. Transferring the flow of control involves first remapping the function's stack frame to incorporate any new locals, then moving the instruction pointer for that frame from the old code to the new code. These two steps are generally referred to together as remapping.

Function Remap Overview

In accordance with an aspect of the present invention, the IDE 200 is responsible for determining an IL offset in a new version and for remapping any stepper(s) and/or breakpoint(s). The CLR environment 100 (e.g., debugger engine) only notifies the IDE 200 (e.g., debugger) that a remap is about to take place from method version x to x+n and provides the IL offset in version x. The IDE 200 (e.g., debugger) is responsible for determining the IL offset in version x+n and for remapping any steppers or breakpoints.

Regarding the remap support itself, when the CLR environment 100 (e.g., debugger engine) receives a function update, it sprinkles the compiled instance of that function with Remap Breakpoints. These can only be at zero-depth stack sequence points. A function will execute the old code until it hits a remap breakpoint, at which point the CLR environment 100 (e.g., debugger engine) notifies the IDE 200 (e.g., debugger) that a remap is to take place. The IDE 200 (e.g., debugger) can choose not to allow the remap or it can provide an IL offset for the new function to start running in. Similarly, should execution return to a function that has been updated, a Remap Breakpoint will be triggered and a remap will be handled at that point.

Exemplary Remapping

In one example, at various points after a function has been edited, the IDE 200 (e.g., debugger) receives a FunctionRemapOpportunity callback notifying the IDE 200 that execution has reached a remap point for that function. The IDE 200 (e.g., debugger) may then choose whether to remap at that point.

If the IDE 200 (e.g., debugger) chooses not to remap, execution continues in the old code for the function. The IDE 200 (e.g., debugger) will receive another remap opportunity at the next remap point.

If the IDE 200 (e.g., debugger) chooses to remap, it calls RemapFunction to tell the runtime where to pick up execution in the new code. For example, the IDE 200 can pass the IL offset of the new IP into the new function body. The CLR environment 100 remaps the stack frame corresponding to the remap point. In this example, RemapFunction may only be called on a frame while the runtime is stopped because of a FunctionRemapOpportunity for that frame. Additionally, in this example, remaps always remap to the latest version of the function.

It is to be appreciated that, in this example, remap opportunities can be given for every frame corresponding to an edited function, and may not necessarily be given immediately after the edit. In fact, it is possible that a function may be edited more than once before a remap opportunity occurs for a given frame. Thus, IDE 200 (e.g., debugger) must be prepared to remap from any version of the function to the latest.

Additionally, in this example, generally, an IDE 200 (e.g., debugger) is not expected to do another edit in response to a RemapOpportunity callback. However, if an IDE 200 (e.g., debugger) does so, it will not receive an opportunity to remap to the latest version of the function until the following remap point. By using SetIP to set the IP to the current location, it can cause the RemapOpportunity to fire again at the current remap point.

Legal Remap Points

In this example, remap opportunities are only given for leaf frames whose corresponding IPs meet both of the following conditions:

(1) The IP is at a zero-stack-depth sequence point; and, (2) The IP is not inside a filter, finally, fault, or catch block Avoiding Cycles in an Object Graph In accordance with yet another aspect of the present invention, a mechanism facilitating lifetime of a dependent object in order to mitigate cycles in an object graph is provided. As noted previously, with edit and continue functionality as provided by the present invention, a new field can be added to a class, even if there are already existing instantiations of that class.

A "dependent handle" which a handle pair listing a parent and its dependent is employed for reference fields as a mechanism for making a new field object dependent on the parent object such that the parent owns the lifetime of its dependent, but the dependent does not impact the lifetime of the parent. The dependent object is promoted when the parent is, and the handle is cleared if the parent is not promoted. In this way, if the dependent points to the parent, this does not create a cycle in the object graph. When an attempt is made to access a new field on an existing class, that field (boxing value types) is created and a structure describing it off the sync block is hung for the object. Additional added fields are pushed onto the front of a linked list. Each field entry in this list contains a dependent handle which maintains the relationship between the new field and its parent. These field entries and the dependent handles are destroyed when the parent and its sync block are destroyed.

It is to be appreciated that the CLR environment 100, the native code component 110, the edit and continue component 120, the assembly, the metadata 140, the intermediate language component 150, the IL compiler 160, the processor 170, the runtime code manager 180, the IDE 200, the source compiler 220, the API(s) 230, the user interface 240, the source code editor 250 and/or the system 300 can be computer components as that term is defined herein.

Figure 4:
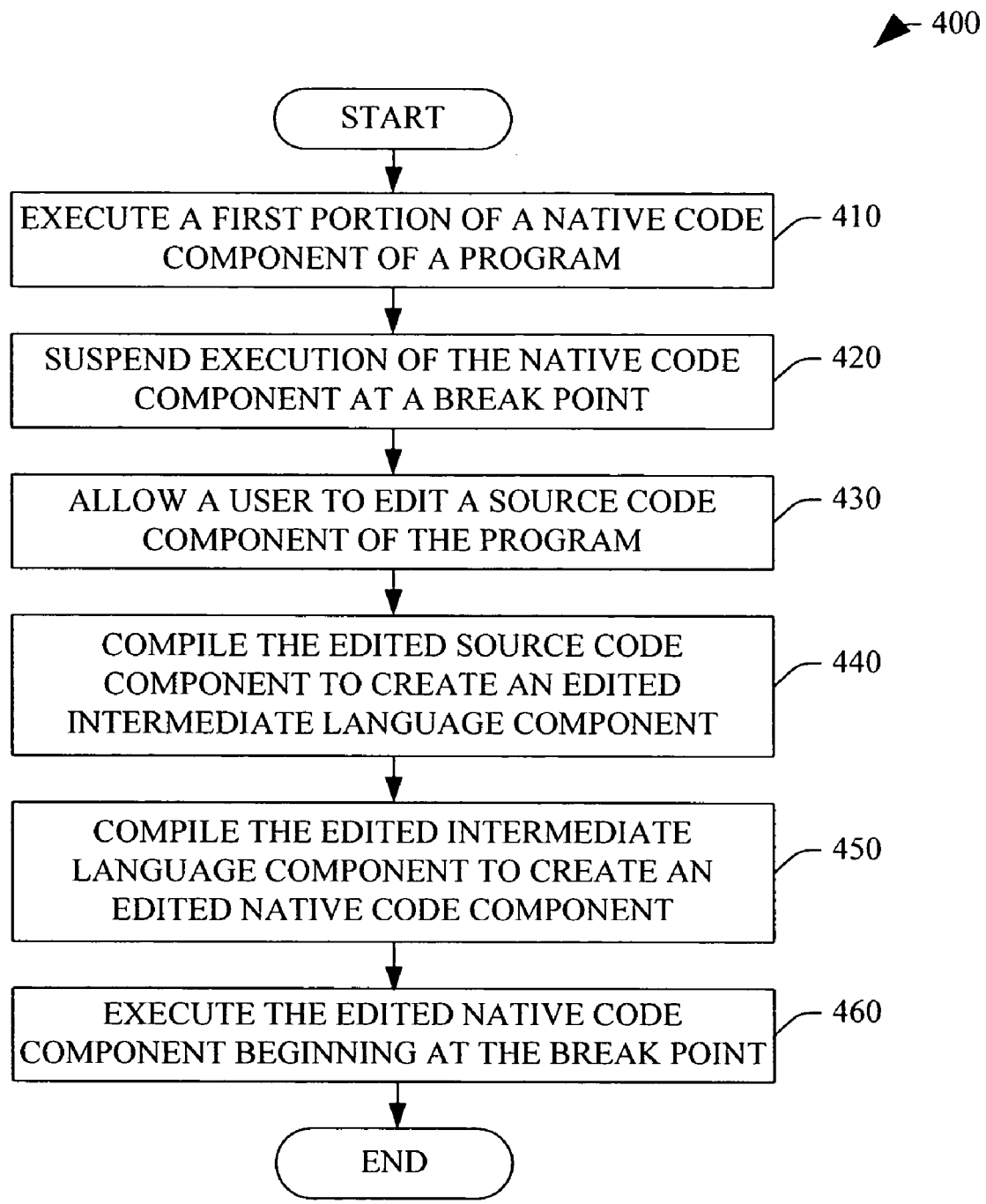
FIG. 4 is a flow chart of a method facilitating programming editing in accordance with an aspect of the present invention.
Figure 5:
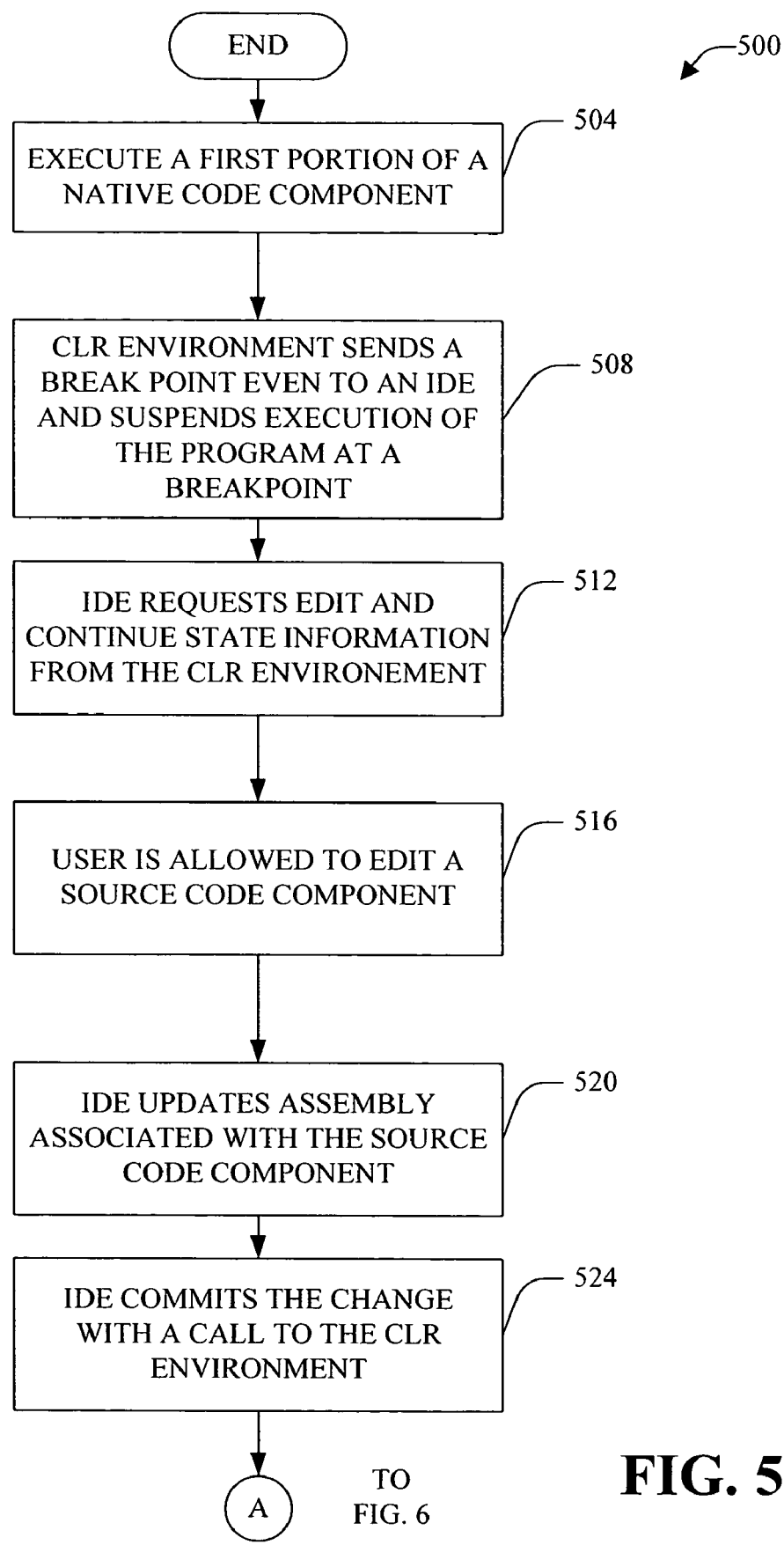
FIG. 5 is a flow chart of a method facilitating programming editing in accordance with an aspect of the present invention.

Turning briefly to FIGS. 4 and 5, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method facilitating programming editing 400 in accordance with an aspect of the present invention is illustrated. At 410, a first portion of a native code component (e.g., native code component 110) is executed. At 420, execution of the native code is suspended at a break point. At 430, a user is allowed to edit a source code component of the program. At 440, the edited source code component is compiled to create an edited intermediate language component. At 450, the edited intermediate language component is compiled to create an edited native code component. At 460, the edited native code component is executed beginning at the break point.

Figure 6:
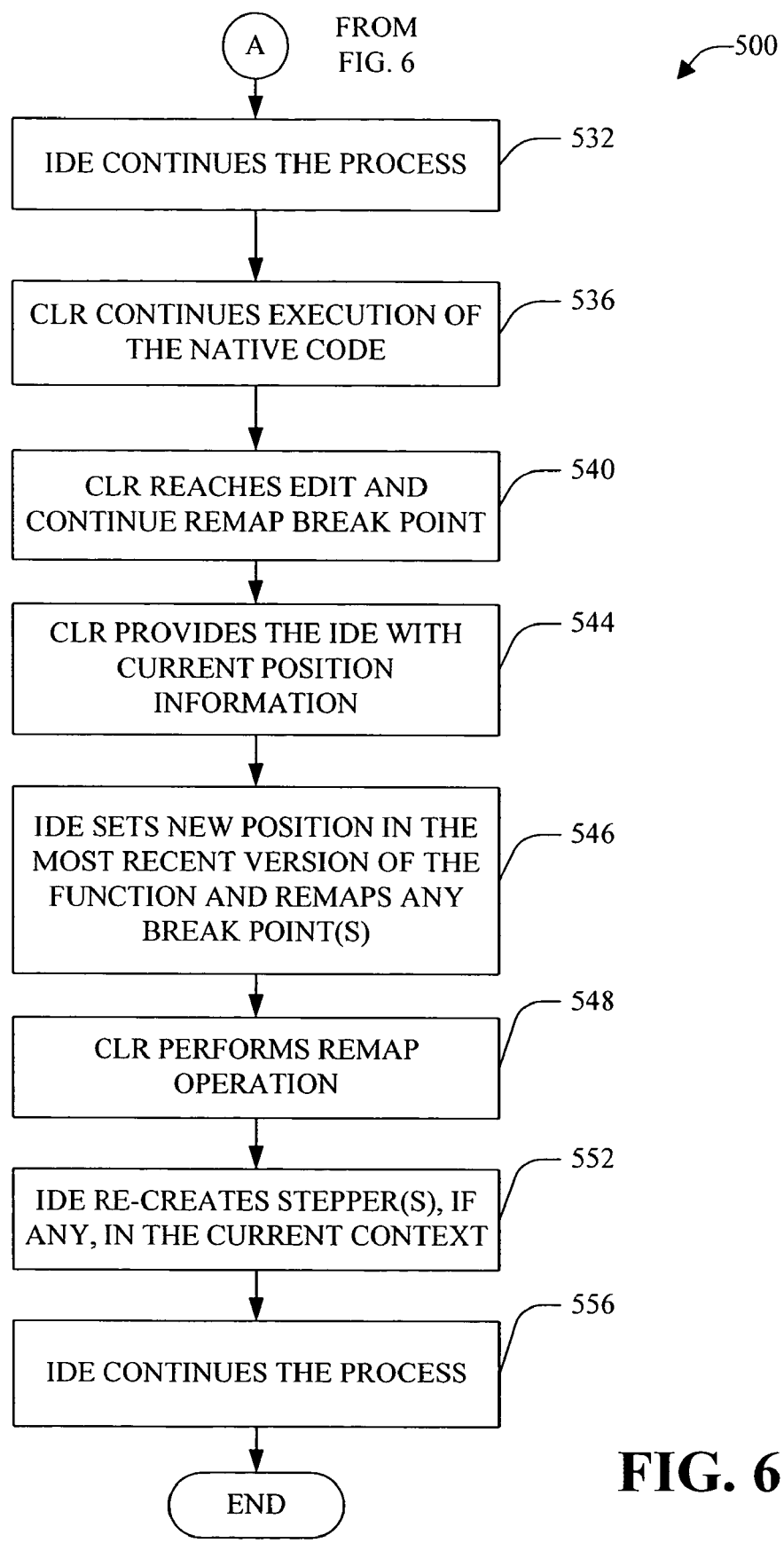
FIG. 6 is a flow chart further illustrating the method of FIG. 5.

Next, turning to FIGS. 5 and 6, a method facilitating programming editing 500 in accordance with an aspect of the present invention is illustrated. At 504, a first portion of a native code component of a program is executed. At 508, a CLR environment sends a breakpoint event to an IDE and suspends execution of the program.

At 512, the IDE request edit and continue state information from the CLR environment (e.g., via API(s) 230 and an edit and continue component 120). At 516, a user is allowed to edit a source code component via the IDE. For example, the IDE can ensure that edit(s) made by the user (e.g., programmer) are valid. In one example, the IDE provides feedback to the programmer and validate each change as it is made.

At 520, the IDE updates an assembly associated with the source program. For example, the user can add a new method, modify a method, add a new field to a class and/or add local(s) to a method etc. Based upon the addition(s) and/or modification(s), the IDE can update the assembly (e.g., metadata and/or IL component). The IDE is responsible for validity of edit(s).

At 524, the IDE commits the change with a call to the CLR environment. At 528, the CLR accepts the change. At 532, the IDE continues the process (e.g., based upon a user initiating a "go" and/or "step" command). At 536, the CLR continues execution of the native code. At 540, an edit and continue remap breakpoint is reached by the CLR.

At 544, the CLR provides the IDE with the current position (e.g., function and IL offset). At 546, the IDE sets the new position (function and IL offset) in the most recent version of the function and remaps any break point(s). At 548, the CLR performs the remap operation. At 552, the IDE re-creates stepper(s), if any, in the current context. At 556, the IDE continues the process.

In accordance with an aspect of the present invention, the CLR environment defines remap points as sequence points with a zero-depth stack. The IDE will typically have a different notion of where a remap can occur. There are times when the IDE is not prepared to allow a new method to be swapped in, perhaps due to the state of the program within a particular statement. For such reasons, it is difficult to provide a sufficiently rich mapping table that the CLR can correctly map from an old instruction to a new. Instead, when the CLR is preparing to swap to a new method version, it asks the IDE for the new target instruction point. At this point, the IDE can choose either not to swap, or to provide a target instruction offset for the new method.

Similarly, the CLR would need a mapping table to determine how to map breakpoints and steppers from the old function version to the new. This has similar difficulties as mapping the instruction offset. Instead, in this example, the IDE performs this action, as it has all the information necessary to do so.

Next, at 560, the IDE continues the process. At 564, the CLR continues execution of the native code based on the remap.

Figure 7:
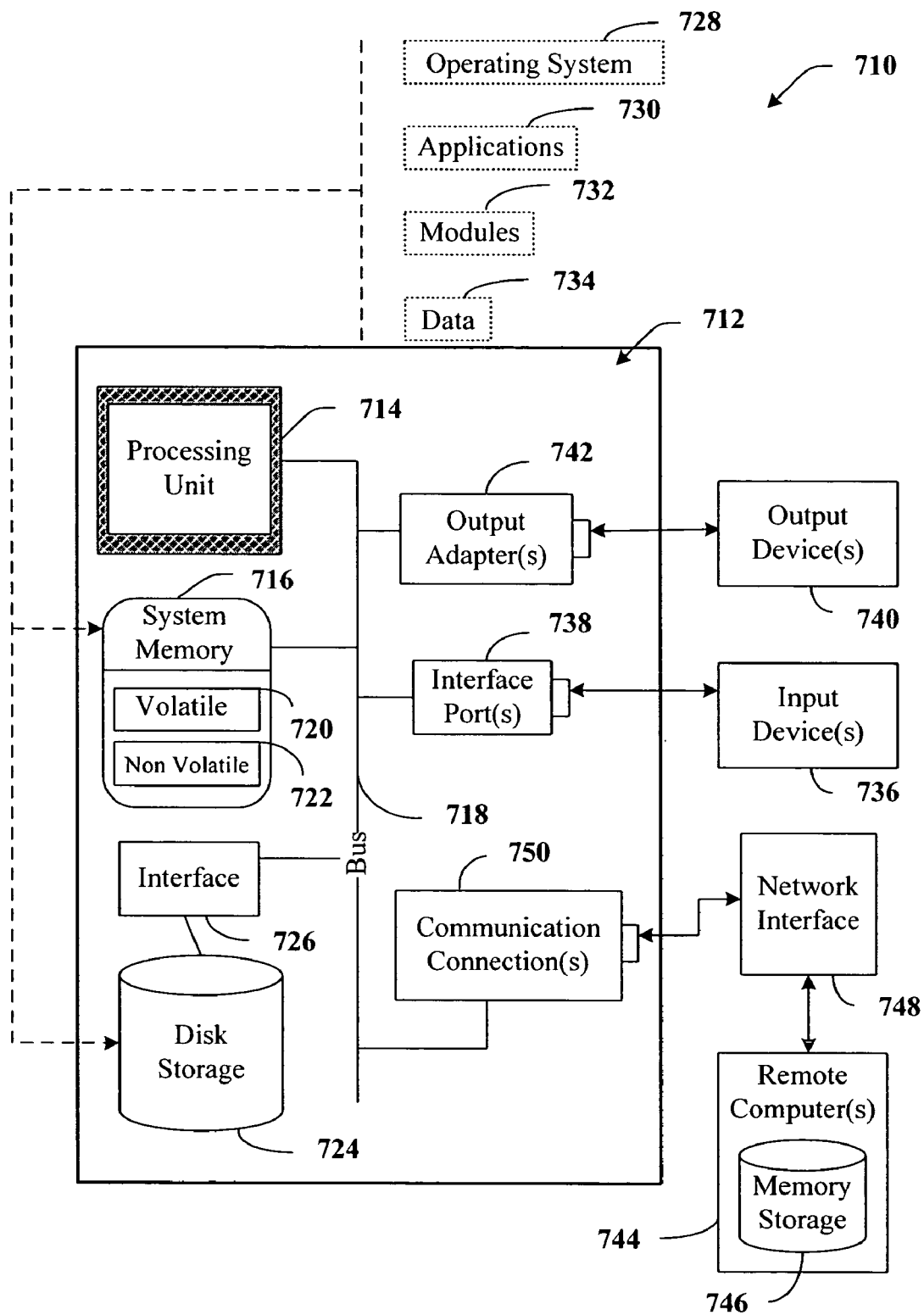
FIG. 7 illustrates an example operating environment in which the present invention may function.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium containing executable components that when executed on one or more processors implement an integrated development environment and a common language runtime environment, comprising:
   a source code component comprising high-level source code of a computer software program;
   an assembly comprising an intermediate language component and metadata associated with the source code component, the intermediate language component is compiled to create native code associated with the software program;
   a user interface that facilitates debugging of the software program;
   an application program interface as part of the integrated development environment that facilitates communication between the user and a common language runtime environment running native code, the integrated development environment receiving a breakpoint event from the common language runtime environment when the native code is suspended at a breakpoint, facilitating editing of the high-level source code, determining legality of an edit as each change associated with the edit is made, building the edit when it is determined to be legal, sending information associated with the edited software program to the common language runtime environment after the edit is determined by the integrated development environment to be legal, and facilitating execution of the edited software program in the common language runtime environment, wherein the edit is determined to be legal when the integrated development environment determines that the common language runtime environment can apply the edits without error; and
   an edit and continue component as part of the common language runtime environment that, in response to receiving notification of an edit to a function associated with the high-level source code from the integrated development environment while the associated native code is running, suspends execution of the native code at a breakpoint, sends notification of the suspension to the integrated development environment, provides current instruction pointer information for a pre-edited version of the function, and receives new instruction pointer information associated with a new version of the function, the common language runtime environment continuing execution of the native code from the breakpoint until a remap breakpoint is reached and subsequently performing a remap operation to facilitate continued execution based on the new instruction pointer information.

2. The computer-readable storage medium of claim 1, further comprising a runtime code manager that facilitates loading and operating of the assembly by a processor.

3. The computer-readable storage medium of claim 1, the high-level source code being based, at least in part, upon at least one of Visual Basic, C++, C#, JavaScript, APL, COBOL, Pascal, Eiffel, Haskell, ML, Oberon, Perl, Python, Scheme, Smalltalk, Objective Caml.

4. The computer-readable storage medium of claim 1, further comprising a source compiler that compiles the source code component to generate an intermediate language component.

5. The computer-readable storage medium of claim 1, a legal edit comprising at least one of adding a non-virtual private method to a class, adding a private field to a class, or adding a private property to a class.

6. The computer-readable storage medium of claim 1, wherein editing of an inactive parameterized function is determined to be not legal by the integrated development environment.

7. The computer-readable storage medium of claim 1, wherein editing of an active function is determined to be not legal by the integrated development environment when it increases the exception-handler nesting to more than a threshold amount, or increases the nesting level of a function that already has more than a second threshold amount of levels.

8. The computer-readable storage medium of claim 1, wherein editing of an active function is determined to be not legal by the integrated development environment when it adds a filter, finally, fault, or catch block that contains the instruction pointer.

9. The computer-readable storage medium of claim 1, wherein editing of an active function is determined to be not legal by the integrated development environment when the function employs localloc.

10. The computer-readable storage medium of claim 1, wherein editing of an active non-leaf function is determined to be not legal by the integrated development environment when the edit adds or removes a try block that contains an instruction pointer.

11. The computer-readable storage medium of claim 1, wherein editing of an active non-leaf function is determined to be not legal by the integrated development environment when it adds, removes or changes the contents of an exception handler whose try block contains an instruction pointer.

12. The computer-readable storage medium of claim 1, wherein the information sent to the common language runtime environment associated with the edited software program includes a block of metadata and/or a block of intermediate language code.

13. The computer-readable storage medium of claim 1, wherein the integrated development environment provides an intermediate language offset into an edited function and remaps a stepper or a break point to transfer the flow of execution from the pre-edited version of the function to the new version of the function.

14. A method implemented in one or more computers for facilitating programming editing comprising:
   compiling an intermediate language component to create native code;
   executing a first portion of native code in a common language runtime environment;
   suspending execution of the native code at a breakpoint to create a breakpoint event;
   sending the breakpoint event to an integrated development environment;
   receiving the breakpoint event at the integrated development environment;
   requesting edit and continue state information from the common language runtime environment;
   receiving an edit to a function of a source code component at the integrated development environment;
   determining whether the edit is legal, wherein the edit is determined to be legal when the edits are capable of being applied and run without error; and,
   when the edit is determined to be legal:
      updating metadata in the common language runtime environment based on the edit;
      updating the intermediate language component based on the edit;
      committing the change;
      continuing execution of the native code from the breakpoint until a remap breakpoint is reached at a remap breakpoint event;
      receiving the remap breakpoint event at the common language runtime environment;
      providing current instruction pointer information for a pre-edit function to the integrated development environment;
      providing a modified instruction pointer for the edited function to the integrated development environment; and,
      performing a remap operation using the modified instruction pointer.

15. A computer readable medium having stored thereon computer executable instructions for carrying out the method of claim 14.

16. A system that facilitates program editing, the system comprising one or more processors executing computer-executable instructions to implement steps of:
   compiling an intermediate language component to create native code;
   executing a first portion of native code in a common language runtime environment;
   suspending execution of the native code at a breakpoint to create a breakpoint event;
   sending the breakpoint event to an integrated development environment;
   receiving the breakpoint event at the integrated development environment;
   requesting edit and continue state information from the common language runtime environment;
   receiving an edit to a function of a source code component at an integrated development language environment;
   confirming the legality of the edit;
   updating metadata in the common language runtime environment based on the edit;
   updating the intermediate language component based on the edit;
   committing the edit;
   continuing execution of the native code from the breakpoint in the common language runtime environment until a remap breakpoint is reached at a remap breakpoint event;
   receiving the remap breakpoint event at the common language runtime environment;
   providing current instruction pointer information for a pre-edited version of the function to the integrated development environment;
   sending a modified instruction pointer for the edited version of the function from the integrated development environment to the common language runtime environment; and
   performing a remap operation using the modified instruction pointer.

* * * * *

UNITED STATES PATENT AND TRADEMARK OFFICE
CERTIFICATE OF CORRECTION

| | | |
|---|---|---|
| PATENT NO. | : 7,516,441 B2 | Page 1 of 1 |
| APPLICATION NO. | : 10/896610 | |
| DATED | : April 7, 2009 | |
| INVENTOR(S) | : Jennifer A. Hamilton et al. | |

It is certified that error appears in the above-identified patent and that said Letters Patent is hereby corrected as shown below:

In column 14, line 65, in Claim 3, delete "ofVisual" and insert -- of Visual --, therefor.

Signed and Sealed this

Third Day of May, 2011

David J. Kappos
*Director of the United States Patent and Trademark Office*